(12) United States Patent
Tschismar (10) Patent No.: US 9,555,691 B2
(45) Date of Patent: Jan. 31, 2017

(54) CLIMATE-CONTROL DEVICE AND METHOD FOR ITS OPERATION

(75) Inventor: Oliver Tschismar, Metzingen (DE)

(73) Assignee: Robert Bosch GmbH, Stuttgart (DE)

( * ) Notice: Subject to any disclaimer, the term of this patent is extended or adjusted under 35 U.S.C. 154(b) by 875 days.

(21) Appl. No.: 13/992,986

(22) PCT Filed: Oct. 24, 2011

(86) PCT No.: PCT/EP2011/068536
§ 371 (c)(1),
(2), (4) Date: Oct. 28, 2013

(87) PCT Pub. No.: WO2012/076237
PCT Pub. Date: Jun. 14, 2012

(65) Prior Publication Data
US 2014/0053584 A1    Feb. 27, 2014

(30) Foreign Application Priority Data

Dec. 10, 2010   (DE) ........................ 10 2010 062 869

(51) Int. Cl.
*B60H 1/32*   (2006.01)
*B60H 1/00*   (2006.01)
*B60H 1/14*   (2006.01)

(52) U.S. Cl.
CPC ........ *B60H 1/3227* (2013.01); *B60H 1/00278* (2013.01); *B60H 1/00392* (2013.01); *B60H 1/00914* (2013.01); *B60H 1/143* (2013.01); *B60H 2001/00307* (2013.01); *B60H 2001/00928* (2013.01); *B60H 2001/00949* (2013.01); *B60H 2001/00957* (2013.01)

(58) Field of Classification Search
CPC ............ B60H 1/00278; B60H 1/00392; B60H 1/00914; B60H 1/143; B60H 1/3227; B60H 2001/00928; B60H 2001/00949; B60H 2001/00957; B60H 2001/00307
USPC ............................... 62/115, 498; 165/104.33
See application file for complete search history.

(56) References Cited

U.S. PATENT DOCUMENTS 3,403,723 A * 10/1968 Meckler ................ F24F 3/1417
165/210
5,549,153 A * 8/1996 Baruschke ......... B60H 1/00278
165/42
(Continued)

FOREIGN PATENT DOCUMENTS

DE         196 09 048      9/1997
EP         1 813 887       8/2007
(Continued)

*Primary Examiner* — Mohammad M Ali
(74) *Attorney, Agent, or Firm* — Norton Rose Fulbright US LLP; Gerard Messina (57) ABSTRACT

A climate control device for conditioning the climate of a plurality of components and an interior of an electric vehicle, the climate control device having a plurality of fluid circuit units, which are configured to heat and/or cool the electric vehicle, a first fluid circuit unit being configured to control the climate of a first component of the electric vehicle, a second fluid circuit unit being configured to control the climate of the interior of the electric vehicle, a coolant circuit being configured to control the climate and dehumidify the interior of the electric vehicle, and a third fluid circuit unit being configured to utilize the waste heat of the second heat source.

17 Claims, 9 Drawing Sheets

(56) References Cited

U.S. PATENT DOCUMENTS

| | | | |
|---|---|---|---|
| 6,370,903 B1 | 4/2002 | Welch | |
| 6,394,210 B2 * | 5/2002 | Matsuda | B60H 1/00278 180/65.1 |
| 6,662,864 B2 * | 12/2003 | Burk | B60H 1/00921 165/202 |
| 7,293,421 B2 * | 11/2007 | Michalski | F25B 17/086 62/101 |
| 7,451,808 B2 * | 11/2008 | Busse | B60H 1/00278 165/202 |
| 7,762,103 B2 * | 7/2010 | Artsiely | F25B 25/02 62/476 |
| 7,789,176 B2 * | 9/2010 | Zhou | B60H 1/00278 180/65.1 |
| 2001/0040061 A1 * | 11/2001 | Matuda | B60H 1/00278 180/68.2 |
| 2005/0061497 A1 | 3/2005 | Amaral et al. | |
| 2005/0133215 A1 * | 6/2005 | Ziehr | B60H 1/00392 165/202 |
| 2006/0060340 A1 * | 3/2006 | Busse | B60H 1/00278 165/202 |
| 2008/0251235 A1 * | 10/2008 | Zhou | B60H 1/00278 165/41 |

FOREIGN PATENT DOCUMENTS

| | | |
|---|---|---|
| JP | 2002 352867 | 12/2002 |
| JP | 2007-69733 | 3/2007 |
| JP | 2010-111269 | 5/2010 |

* cited by examiner

CLIMATE-CONTROL DEVICE AND METHOD FOR ITS OPERATION

FIELD OF THE INVENTION

The present invention relates to a climate-control device, a climate control unit, a method for controlling the climate of an interior space and to a method for operating a climate control unit of an electric vehicle.

BACKGROUND INFORMATION

The German patent DE 19609048 C2 discusses a heating and air conditioning device for motor vehicles. The heating and air-conditioning device includes a first fluid circuit, which encompasses a heat conductor, a pump and a heat source for heating the fluid, and air is applied to the heat conductor on the secondary side and a blower is provided to generate an air flow. In addition, the heating and air conditioning device includes cooling circuits provided with an evaporator, a condenser and a compressor, as well as a control unit for regulating the cooling circuit as a function of at least one signal from a temperature sensor and an adjustable setpoint value.

The heating and air-conditioning device discussed there also includes a second fluid circuit, which is able to be connected via a valve by the first fluid circuit, the second fluid circuit having a thermo-accumulator as well as a pump, and a heat source in the first fluid circuit is a heating device which is independent of a vehicle operation and used to heat the air flowing through the heat conductor and/or to charge the thermo-accumulator with thermal energy. In the system, the evaporator of the cooling circuit is thermally coupled to the heat conductor by the second fluid circuit and used for charging the thermo-accumulator with cooling energy.

SUMMARY OF THE INVENTION

Accordingly, the present invention provides a climate control device and a method for controlling the climate of an interior of an electric vehicle, the climate control device having a plurality of fluid circuits, which include the particular operating media and are configured to heat and/or cool the electric vehicle. A first fluid circuit unit, from a first pump, via a first heat source, further via a first three-way valve and via a first heat conductor, back again to the first pump, is able to be activated and configured to control the climate of a first component of the electric vehicle. A second fluid circuit unit, from the first pump, via the first heat source, further via the first three-way valve, further via a second heat conductor and via a third heat conductor, and back again to the first pump, is able to be activated and configured to control the climate of the interior of the electric vehicle.

In addition, a third fluid circuit unit, from a second three-way valve, further via an internal heat conductor, further via a third three-way valve, and, for one, further via a first expansion organ and a fourth heat conductor to a storage reservoir and, for another, further via a second expansion organ and a fifth heat conductor to the storage reservoir, from the storage reservoir via a compressor having a second pump, further via the second heat conductor, further via a fourth three-way valve, further via a sixth heat conductor, back again to the second three-way valve, is able to be activated and developed to control the climate and to dehumidify the interior of the electric vehicle. In addition, a fourth fluid circuit unit, from a third pump, via a second heat source of a second component of the electric vehicle, further via the fifth heat conductor, back again to the third pump, is able to be activated and developed to utilize the waste heat of the second heat source.

Moreover, the present invention provides a climate control unit and a method for operating the climate control unit, which includes an internal heat conductor, an external fluid circuit as well as internal fluid circuits, a first internal fluid circuit being developed from the internal heat conductor, via a first expansion valve, via a first evaporator, via a fluid collector, back again to the internal heat conductor; and a second internal fluid circuit being developed from the internal heat conductor, via an electric air-conditioner compressor, via a first heat conductor unit, via a second valve, back again to the internal heat conductor; and a third internal fluid circuit being developed, from the internal heat conductor, via a third expansion valve, via a second evaporator, via the fluid collector, back again to the internal heat conductor; and the external fluid circuit being developed from the internal heat conductor, via a second expansion valve, via a second heat conductor unit, via a first valve, via the fluid collector, back again to the internal heat conductor.

The climate control device, the climate control unit, the method for controlling the climate of an interior, and the method for operating a climate control unit provided according to the present invention have the advantage that the heating, cooling and dehumidifying functions are carried out using a minimum of energy.

Advantageous refinements of and improvements to the respective subject matter of the present invention are set forth in the further descriptions herein.

According to one further refinement of the climate control device, the first heat source and/or the second heat source include(s) a thermal mass of an electric motor, power electronics and/or a traction battery of the electric vehicle.

According to one further refinement of the climate control device, the first fluid circuit unit and/or the second fluid circuit unit and/or the third fluid circuit unit and/or the fourth fluid circuit unit are/is implemented as coolant circuit(s), in which a coolant as working medium is circulating within the fluid circuit units, and a corresponding pump is provided for circulating the working medium.

According to one further refinement of the climate control device, the third fluid circuit unit has a bridging unit, which is provided to heat the interior of the electric vehicle and to condition the climate of a component of the electric vehicle.

According to one further refinement of the climate control device, the second heat conductor and/or the fifth heat conductor and/or the internal heat conductor are/is developed as cross-counter flow heat conductor.

According to a further refinement of the climate control device, the first heat conductor and/or the second heat conductor and/or the fourth heat conductor and/or the sixth heat conductor are/is developed as active heat conductor(s) having additionally mounted blowers.

According to one further refinement of the climate control device, one of the plurality of components of the electric vehicle to be air-conditioned includes an electric energy store of the electric vehicle, which is to be operated within a temperature range.

According to one further refinement of the climate control device, the climate control device has a third expansion organ in the third fluid circuit, for actuating the one sixth heat conductor at a lower operating pressure, which makes it possible to achieve simultaneous heating and/or cooling and dehumidifying of the interior of the electric vehicle.

According to one further development of the climate control device, thermal masses of a body shell, a chassis, an underbody or of components such as batteries or electric motors of the electric vehicles having lower temperatures are provided as heat source of the climate control device.

According to one further refinement of the method for controlling the climate of an interior and/or at least one component of an electric vehicle, the third fluid circuit is operated as coolant circuit using carbon dioxide, especially using the R744 coolant.

Further features and advantages of specific embodiments of the present invention result from the following description with reference to the enclosed figures.

DETAILED DESCRIPTION

In the figures, like reference numerals designate like or functionally equivalent components.

Figure 1:
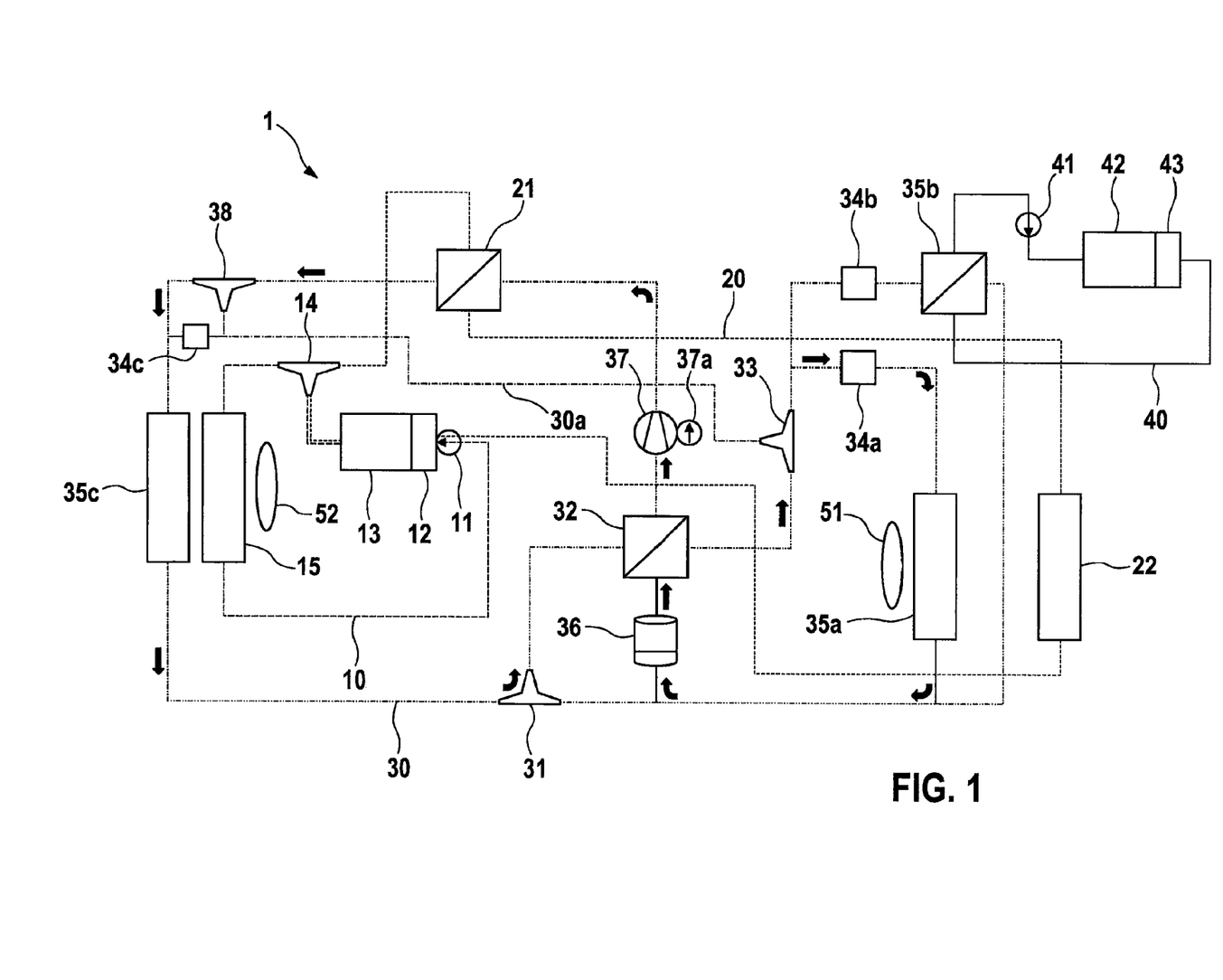
FIG. 1 shows a schematic illustration of the structure of the climate control device according to a first specific embodiment of the present invention.

FIG. 1 shows a schematic illustration of the structure of a climate control device 1 according to one specific embodiment of the present invention. For example, climate control device 1 includes power electronics or an electric motor as heat source 12, 13; however, it is also possible to use another thermal mass of the electric vehicle as heat source, such as a battery, for instance. Climate control device 1 for controlling the climate of a plurality of components and/or an interior of an electric vehicle also includes several fluid circuit units 10, 20, 30, 40, which are configured to heat and/or cool the electric vehicle. A first fluid circuit unit 10, from a first pump 11, via a first heat source 12, 13, further via a first three-way valve 14 and via a first heat conductor 15, back again to first pump 11, may be activated and is configured to control the climate of a first component of the electric vehicle. Furthermore, for example, a second fluid circuit unit 20, from first pump 11, via first heat source 12, 13, further via first three-way valve 14, further via a second heat conductor 21 and via a third heat conductor 22, back again to first pump 11, may be activated and is configured to control the climate of the interior of the electric vehicle.

For example, a third fluid circuit unit 30, from a second three-way valve 31, further via an internal heat conductor 32, further via a third three-way valve 33, and for one, further via a first expansion organ 34a and a fourth heat conductor 35a, to a storage reservoir 36, and for another, further via a second expansion organ 34b and a fifth heat conductor 35b to storage reservoir 36, from storage reservoir 36 via a compressor 37 having a second pump 37a, further via second heat conductor 21, further via a fourth three-way valve 38, further via a sixth heat conductor 35c, back again to second three-way valve 31, is able to be activated and configured to condition and dehumidify the climate of the interior of the electric vehicle.

In addition, for example, a fourth fluid circuit unit 40, from a third pump 41, via a second heat source 42, 43 of a second component of the electric vehicle, further via fifth heat conductor 35b back again to third pump 41 is able to be activated and configured to utilize the waste heat of second heat source 42, 43. A further change in operating modes of third fluid circuit unit 30 is possible between fourth three-way valve 38 and third three-way-valve 33, via a connecting path 30a having a third expansion organ 34c. In addition, for example, the heat conducting capacity of first heat conductor 15 and sixth heat conductor 35c is increased by an additionally installed blower 52. In the same way, for instance, an additional blower 51 is added to third heat conductor 22 and fourth heat conductor 35a. Illustrated heat conductors 15, 22, 35a, 35b and 35c, for example, are developed as plate heat conductors, spiral heat conductors or tube heat conductors.

Figure 2:
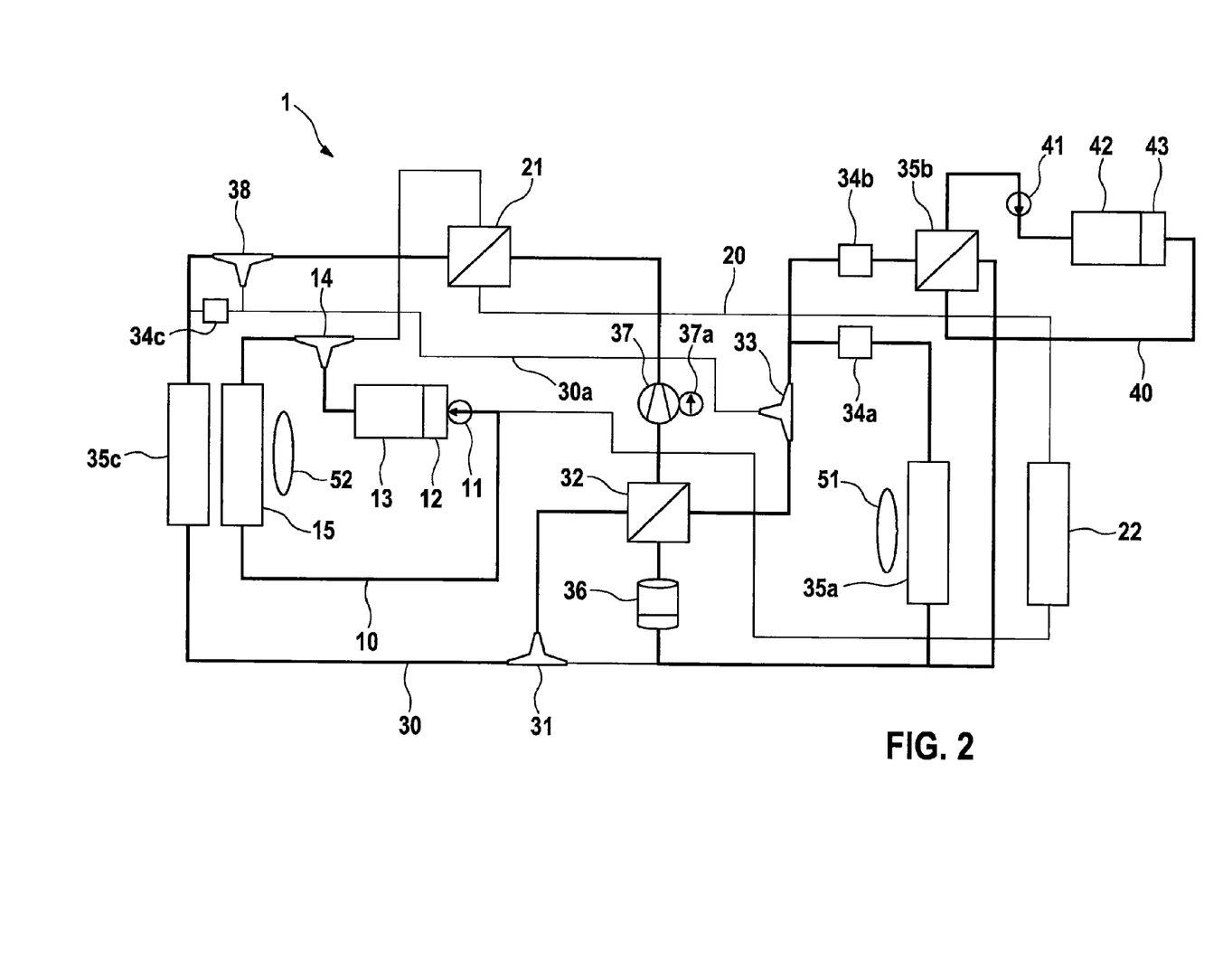
FIG. 2 shows a schematic illustration of the structure of the climate control device, with a marked valve position of the valves according to a further specific embodiment of the present invention.

FIG. 2 shows a schematic representation of the structure of climate control device 1 with a marked valve position of the valves according to one further specific development of the present invention. FIG. 2 essentially shows the same components as FIG. 1, using the same reference numerals, but a marked valve position of the valves of climate control device 1 is shown in FIG. 2 in addition. In the marked valve position of the valves, first fluid circuit unit 10 is in a closed operating mode, and third fluid circuit unit 30 as well as fourth fluid circuit unit 40 are activated.

Figure 3:
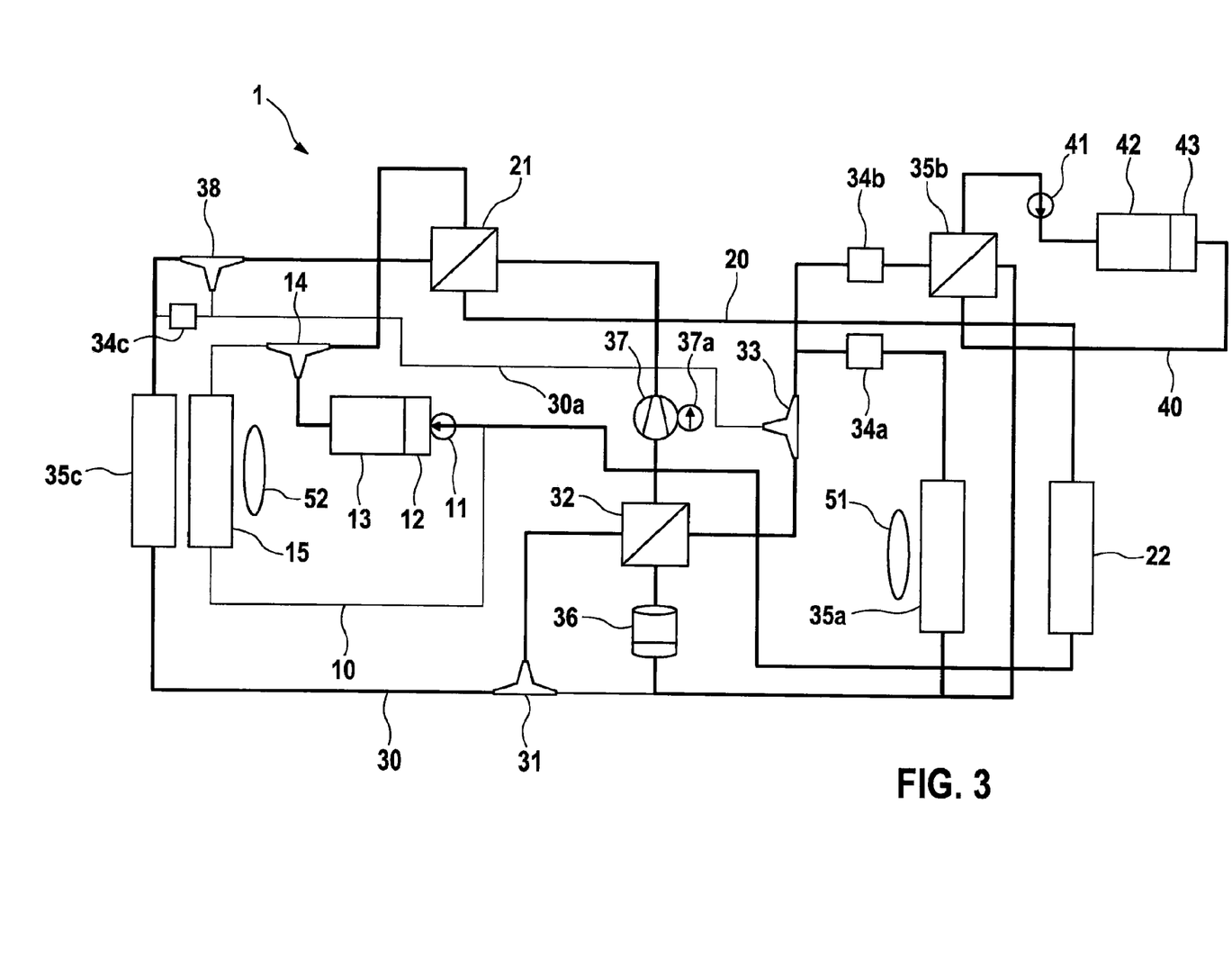
FIG. 3 shows a schematic illustration of the structure of the climate control device, with a marked valve position of the valves according to a further specific embodiment of the present invention.

FIG. 3 shows a schematic representation of the structure of climate control device 1 with a marked valve position of the valves according to one further specific development of the present invention. FIG. 3 essentially shows the same components as FIG. 1, using the same reference numerals, but a further marked valve position of the valves of climate control device 1 is shown in addition. In the further marked valve position of the valves of climate control device 1, second fluid circuit unit 20, third fluid circuit unit 30, and fourth fluid circuit unit 40 are activated, second fluid circuit unit 20 and third fluid circuit unit 30 being in thermal contact via second heat conductor 21.

Figure 4:
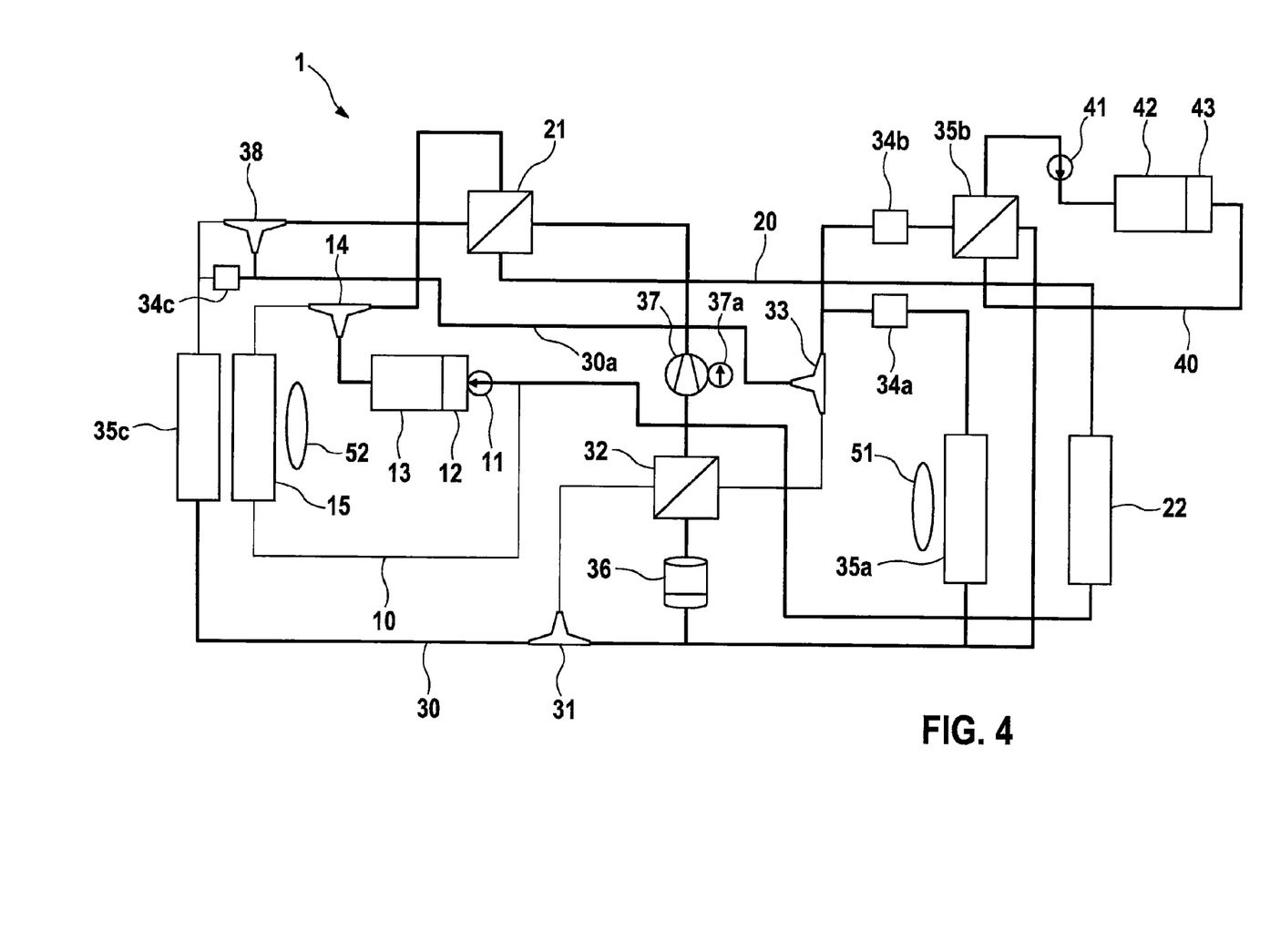
FIG. 4 shows a schematic illustration of the structure of the climate control device, with a marked valve position of the valves according to a further specific embodiment of the present invention.

FIG. 4 shows a schematic representation of the structure of climate control device 1 with a marked valve position of the valves according to one further specific development of the present invention. FIG. 4 essentially shows the same components as FIG. 1, using the same reference numerals, but a further marked valve position of the valves of climate control device 1 is shown in FIG. 4 in addition. In the marked valve position of the valves of climate control device 1, second fluid circuit unit 20, third fluid circuit unit 30, and fourth fluid circuit unit 40 are activated, activated connection path 30a switching an expanded operating mode of third fluid circuit unit 30.

Figure 5:
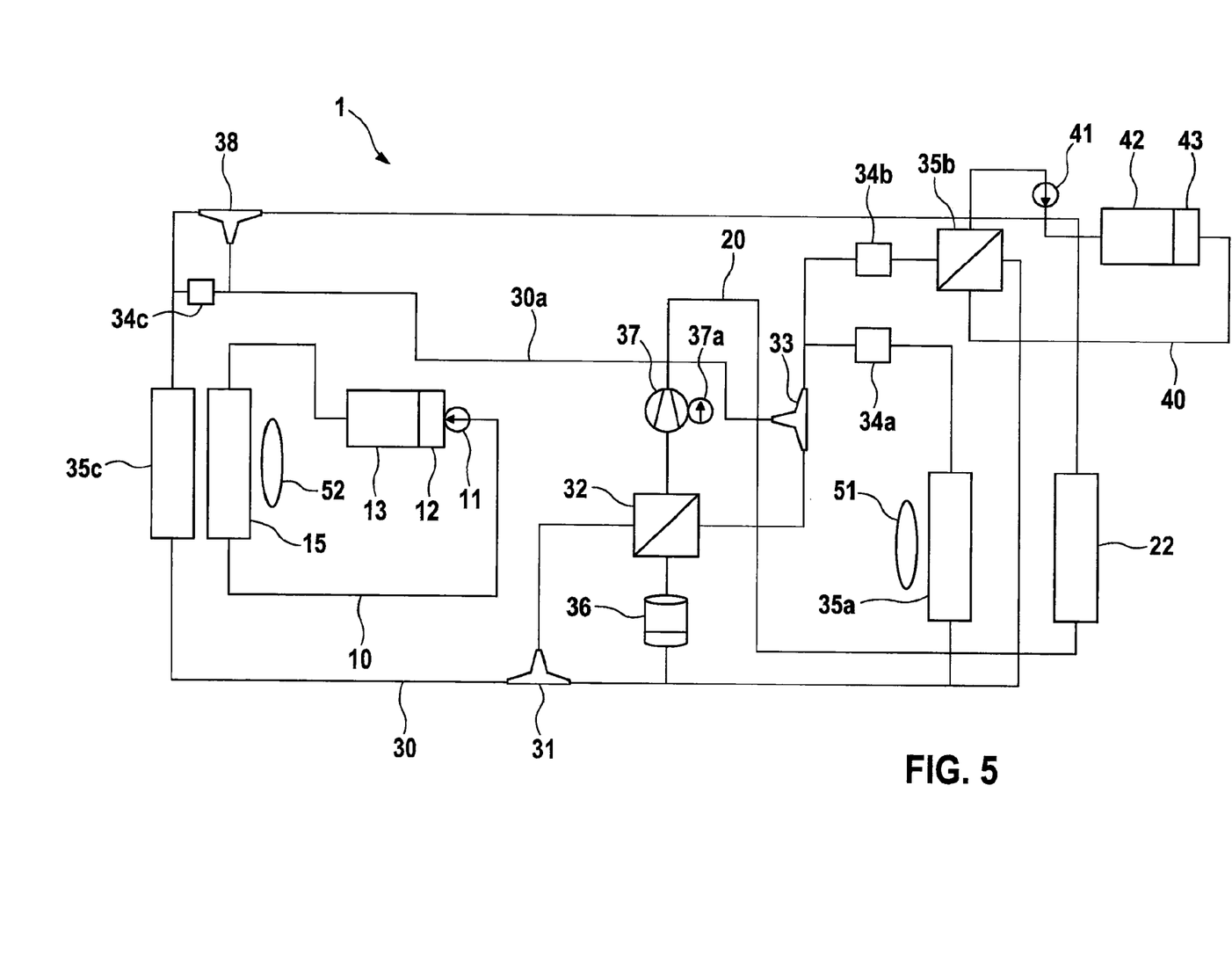
FIG. 5 shows a schematic illustration of the structure of the climate control device according to a further specific embodiment of the present invention.

FIG. 5 shows a schematic illustration of the structure of a climate control device 1 according to one further specific embodiment of the present invention. FIG. 5 essentially shows the same components as FIG. 1, using the same reference numerals, but in addition, FIG. 5 shows another specific embodiment, in which second heat conductor 21 is dispensed with and compressor 37 is connected to third heat conductor 22 instead of the now missing second heat conductor 21. Furthermore, first fluid circuit unit 1 now is a sealed fluid circuit unit and is no longer connected to third fluid circuit unit 30, since second heat conductor 21 as a connecting link between the individual fluid circuit units is missing.

Figure 6:
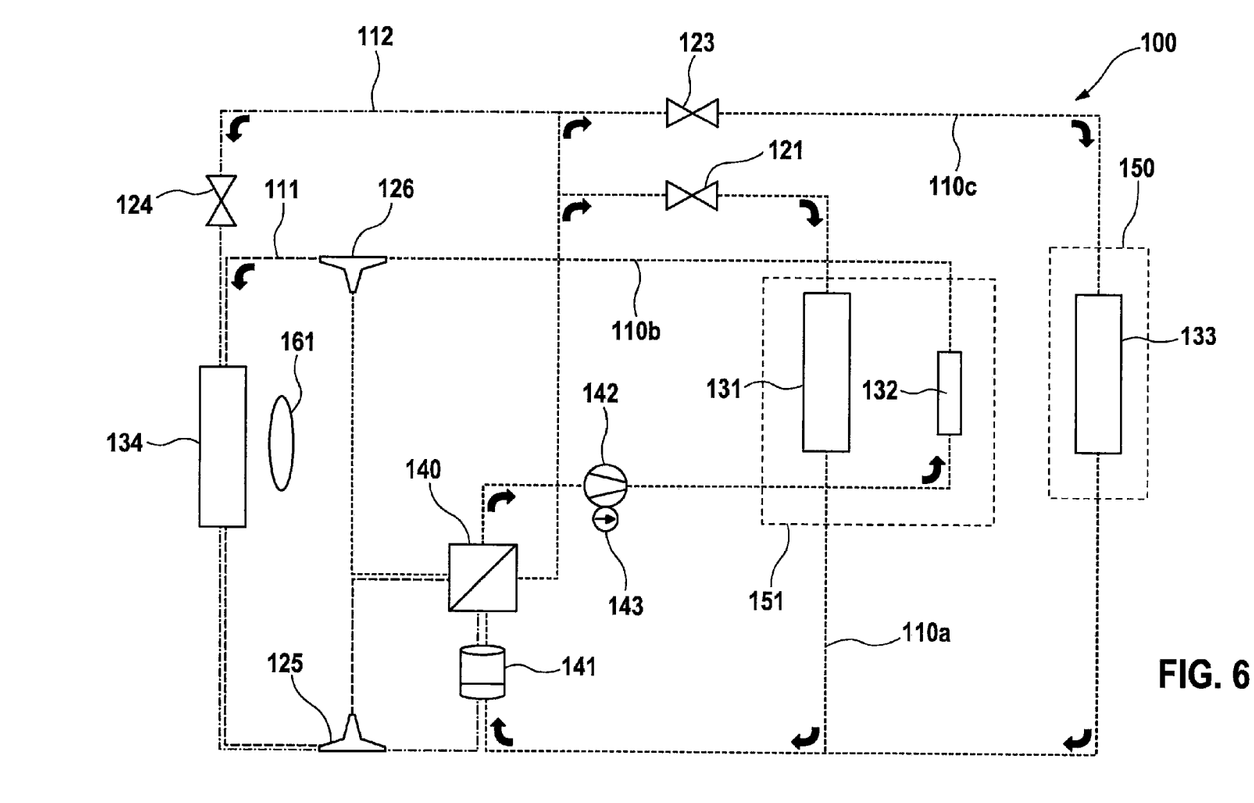
FIG. 6 shows a schematic illustration of the structure of the climate control unit according to a first specific embodiment of the present invention.

FIG. 6 shows a schematic illustration of the structure of a climate control device 100 according to a first specific embodiment of the present invention. Climate control unit 100 includes an internal heat conductor 140, an external fluid circuit 112 and internal fluid circuits 110a, 110b, 110c. A first internal fluid circuit 110a is developed from internal heat conductor 140, via a first expansion valve 121, via a first evaporator 131, via a fluid collector 141, back again to internal heat conductor 140. In addition, for example, a second internal fluid circuit 110b is developed from internal heat conductor 140, via an electrical air-conditioner compressor 142 having an electrically driven pump 143, via a first heat conductor unit 132, via a second valve 126, back again to internal heat conductor 140; and a third internal fluid circuit 110c is developed from internal heat conductor 140, via a third expansion valve 123, via a second evaporator 133, via fluid collector 141, back again to internal heat conductor 140, external fluid circuit 112 being developed from internal heat conductor 140, via a second expansion valve 124, via a second heat conductor unit 134, via a first valve 125, via fluid collector 141, back again to internal heat conductor 140. First evaporator 131 and first heat conductor unit 132 form an interior climate control unit 151, and second evaporator 133 is used as battery or as climate control unit 150 for the power electronics. A blower 161 is installed on second heat conductor unit 134, for instance, and increases the heat transfer of second heat exchange unit 134. Furthermore, for example, a second external fluid circuit 111 is provided at second valve 126, which connects second heat conductor unit 134 to internal heat exchanger 140. Because of third internal fluid circuit 110c, any heat source, such as a battery or power electronics of the electric vehicle, is able to be used to receive thermal energy from a reservoir having a lower temperature, and to transfer it as useful heat to the interior to be heated at a higher temperature. First heat conductor unit 132 and second heat conductor unit 134, for instance, are implemented as gas coolers or as evaporators.

Figure 7:
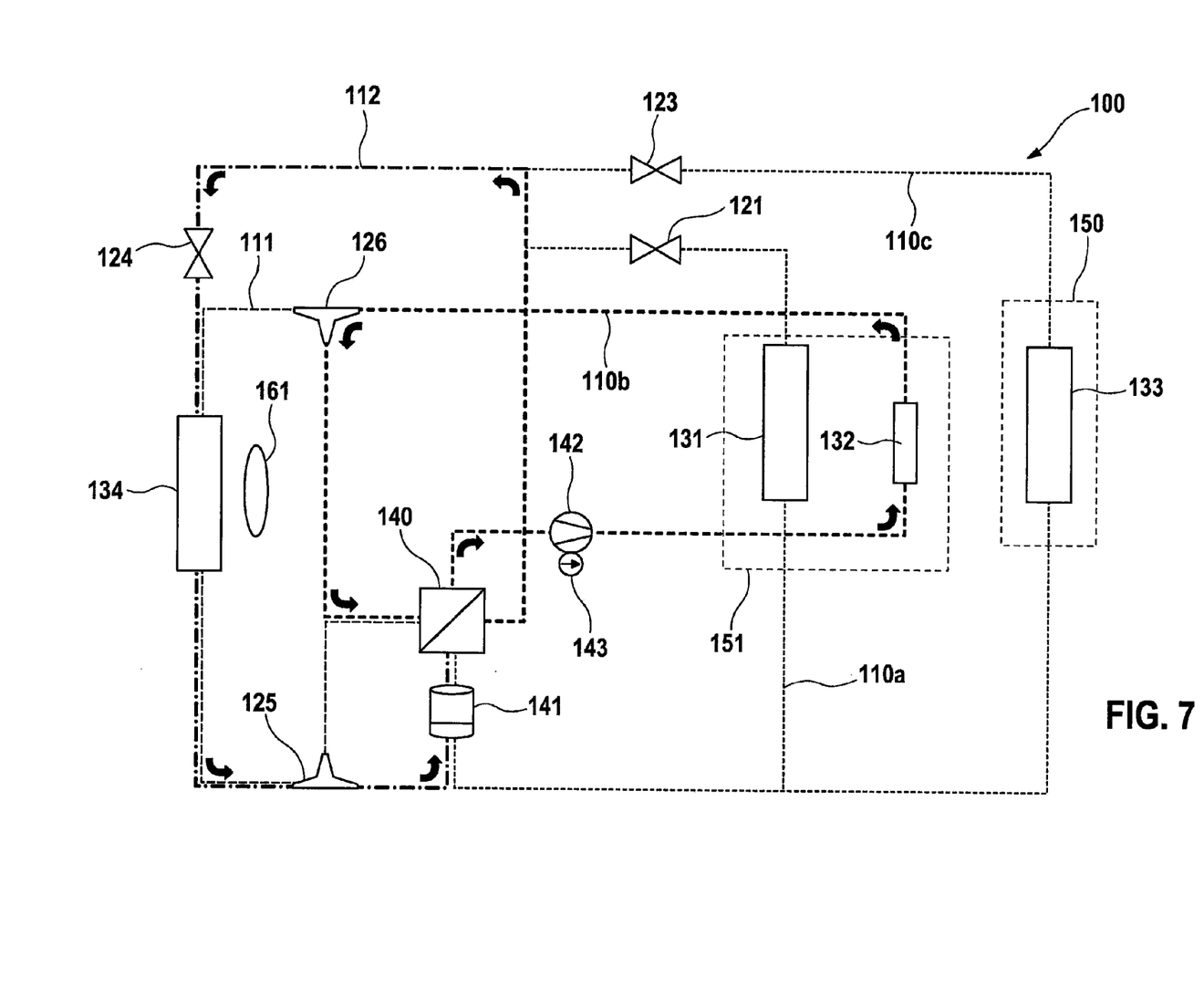
FIG. 7 shows a schematic illustration of the structure of the climate control unit, with a marked valve position of the valves according to a further specific embodiment of the present invention.

FIG. 7 shows a schematic representation of the structure of climate control device 100, with a marked valve position of the valves according to one further specific development of the present invention. FIG. 7 essentially shows the same components as FIG. 6, using the same reference numerals, but in addition, FIG. 7 shows a valve position of the valves of climate control unit 100 by a bolder representation of the activated circuits, external fluid circuit 112 and second internal fluid circuit 110b being operated in an activated state. The illustrated operating mode of climate control unit 100 is used to heat the interior of the electric vehicle, climate control unit 100 being operated as heat pump.

Figure 8:
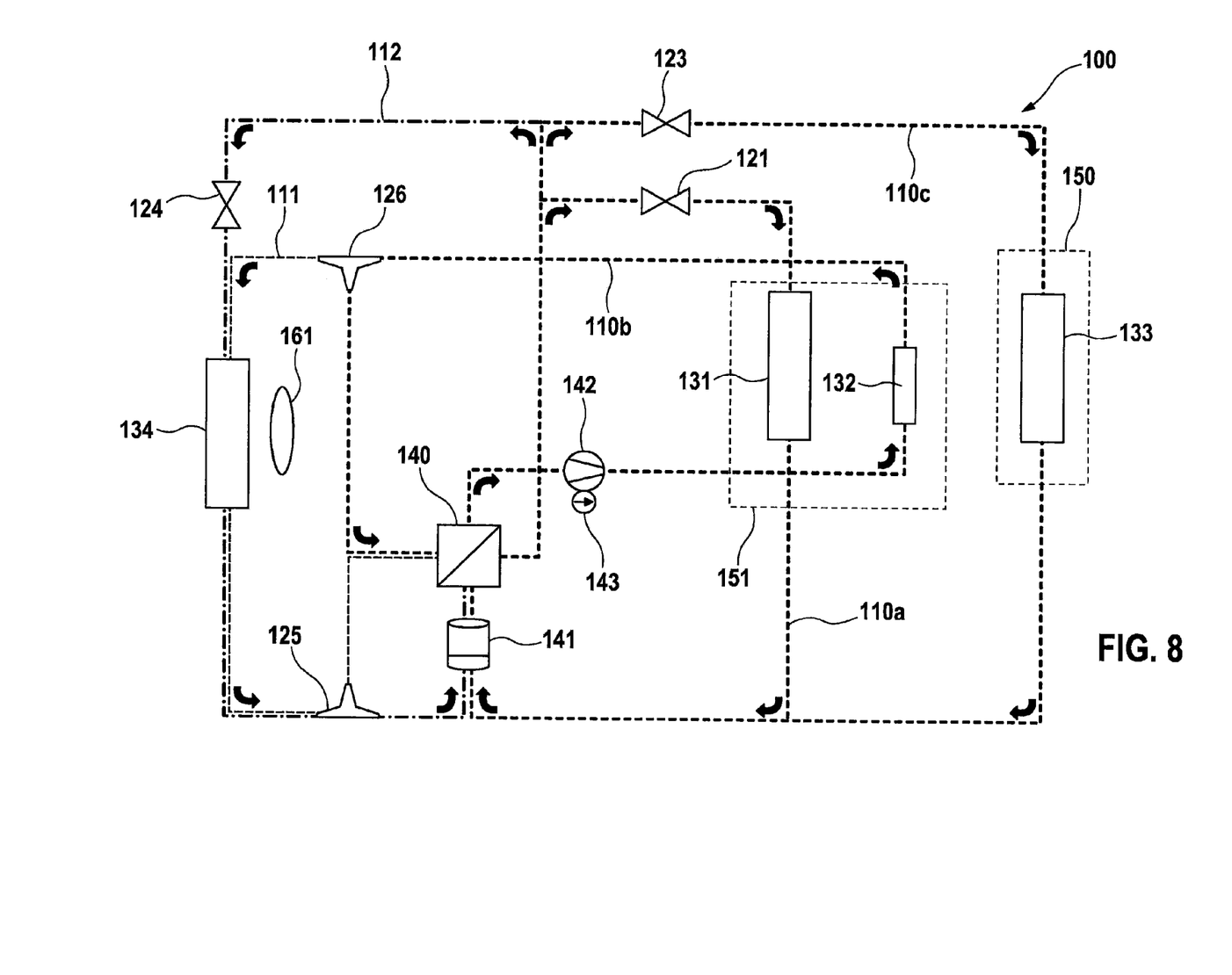
FIG. 8 shows a schematic illustration of the structure of the climate control unit, with a marked valve position of the valves according to a further specific embodiment of the present invention.

FIG. 8 shows a schematic representation of the structure of climate control device 100 with a marked valve position of the valves according to one further specific development of the present invention. FIG. 8 essentially shows the same components as FIG. 6, using the same reference numerals, but in addition, FIG. 8 shows a valve position of the valves of climate control unit 100 by a bolder representation of the activated circuits, climate control unit 100 being operated by internal fluid circuits 110a, 110b, 110c and external fluid circuit 112 in an activated state. The illustrated operating mode of climate control unit 100 is provided as an operating mode for heating the interior of the electric vehicle, and defrosting of second heat conductor unit 134 in external fluid circuit 112 is furthermore made possible by closing second expansion valve 124. Heating of the interior of the electric vehicle is possible by operating climate control unit 100 as heat pump, for example.

Figure 9:
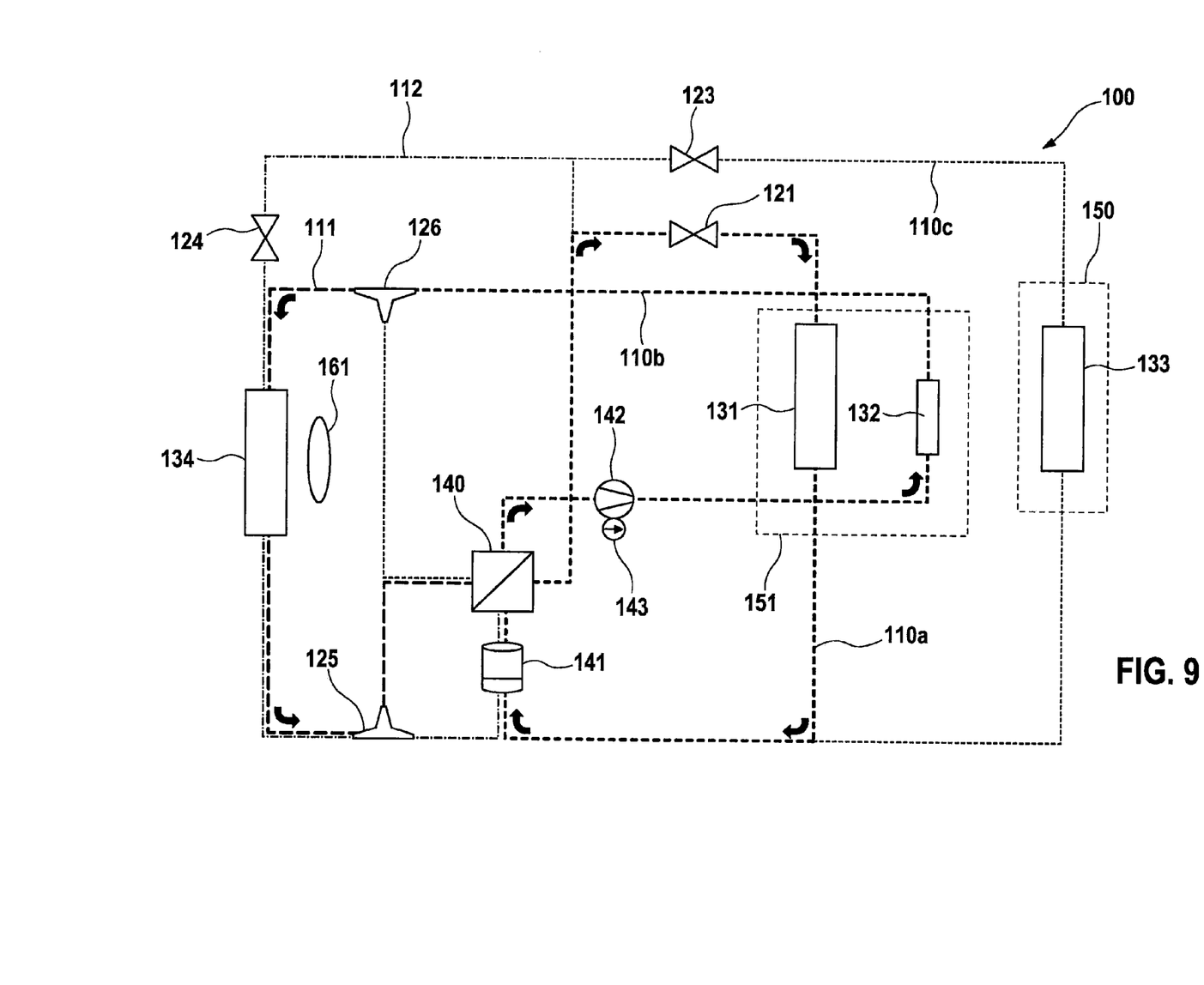
FIG. 9 shows a schematic illustration of the structure of the climate control unit, with a marked valve position of the valves according to a further specific embodiment of the present invention.

FIG. 9 shows a schematic representation of the structure of the climate control unit with a marked valve position of the valves according to a further specific development of the present invention. FIG. 9 essentially shows the same components as FIG. 6, using the same reference numerals, but in addition, FIG. 9 shows a valve position of the valves of climate control unit 100 by a bolder representation of the activated circuits, climate control unit 100 being operated by a second internal fluid circuit 111, first internal fluid circuit 110a and second internal fluid circuit 110b in an activated state. The illustrated operating mode of climate control unit 100 is used to cool the interior of the electric vehicle, climate control unit 100 being operated as heat pump. In the process, first heat conductor unit 132 does not have a flow on the air side.

Although the present invention has been elucidated in the text above with reference to exemplary embodiments, it is not restricted to them, but may be implemented in other ways as well.

What is claimed is:

1. A climate control device for controlling at least one of a climate of a plurality of components and an interior of an electric vehicle, comprising:
    a plurality of fluid circuit units configured to at least one of heat and cool the electric vehicle, including:
        a first fluid circuit unit, from a first pump, via a first heat source, further via a first three-way valve and via a first heat conductor, back again to the first pump, being activatable and configured to control the climate of a first component of the electric vehicle;
        a second fluid circuit unit, from the first pump, via the first heat source, further via the first three-way valve, further via a second heat conductor and via a third heat conductor, back again to the first pump, being activatable and configured to control the climate of the interior of the electric vehicle;
        a third fluid circuit unit, from a second three-way valve, further via an internal heat conductor, further via a third three-way valve, for one, further via a first expansion organ and a fourth heat conductor, to a storage reservoir and, for another, further via a second expansion organ and a fifth heat conductor to the storage reservoir, from storage reservoir via a compressor having a second pump, further via the second heat conductor, further via a fourth three-way valve, further via a sixth heat conductor, back again to the second three-way valve, being activatable and configured to condition and dehumidify the climate of the interior of the electric vehicle;

a fourth fluid circuit unit, from a third pump, via a second heat source of a second component of the electric vehicle, further via the fifth heat conductor back again to the third pump, being activatable and configured to utilize the waste heat of the second heat source.

2. The climate control device of claim 1, wherein at least one of the first heat source and the second heat source includes a thermal mass of at least one of an electric motor, power electronics, and a traction battery of the electric vehicle.

3. The climate control device of claim 1, wherein at least one of the first fluid circuit unit, the second fluid circuit unit, the third fluid circuit unit, and the fourth fluid circuit unit is implemented as a coolant circuit having a coolant as working medium, which circulates within the fluid circuit units, and wherein there is a corresponding pump to circulate the working medium.

4. The climate control device of claim 1, wherein the third fluid circuit unit has a bridging unit to heat the interior of the electric vehicle and to air-condition a component of the electric vehicle.

5. The climate control device of claim 1, wherein at least one of the second heat conductor, the fifth heat conductor, and the internal heat conductor is configured as a cross-counter flow heat conductor.

6. The climate control device of claim 1, wherein at least one of the first heat conductor, the second heat conductor, the fourth heat conductor, and the sixth heat conductor is implemented as an active heat conductor having additionally installed blowers.

7. The climate control device of claim 1, wherein at least one of the plurality of components of the electric vehicle to be air-conditioned includes an electric energy store of the electric vehicle which is to be operated in a specific temperature range.

8. The climate control device of claim 1, further comprising:

a third expansion organ in the third fluid circuit for actuating the sixth heat conductor at a lower operating pressure, so as to provide at least one of simultaneous heating, cooling and dehumidifying of the interior of the electric vehicle.

9. The climate control device of claim 1, wherein thermal masses of a body shell, a chassis or an underbody of the electric vehicle having lower temperatures are provided as heat source of the climate control device.

10. A climate control unit, comprising:
an internal heat exchanger;
an external fluid circuit;
a first internal fluid circuit, a second internal fluid circuit, and a third internal fluid circuit, the internal fluid circuits having an interior air conditioning unit to at least one of heating and cooling an interior of an electric vehicle;
wherein the first internal fluid circuit is configured from the internal heat exchanger, via a first expansion valve, via a first evaporator, via a fluid collector, back again to the internal heat exchanger,
wherein the second internal fluid circuit is configured from the internal heat exchanger, via an electric air-conditioner compressor, via a first heat conductor unit, via a second valve, back again to the internal heat exchanger,
wherein the third internal fluid circuit is configured from the internal heat exchanger, via a third expansion valve, via a second evaporator, via the fluid collector, back again to the internal heat exchanger, and
wherein the external fluid circuit is configured from the internal heat exchanger, via a second expansion valve, via a second heat conductor unit, via a first valve, via the fluid collector, back again to the internal heat exchanger.

11. A method for operating a climate-control unit, the method comprising:
operating the climate control unit, wherein the climate control unit, includes: an internal heat exchanger; an external fluid circuit; a first internal fluid circuit, a second internal fluid circuit, and a third internal fluid circuit, the internal fluid circuits having an interior air conditioning unit to at least one of heating and cooling an interior of an electric vehicle,
wherein the first internal fluid circuit is configured from the internal heat exchanger, via a first expansion valve, via a first evaporator, via a fluid collector, back again to the internal heat exchanger,
wherein the second internal fluid circuit is configured from the internal heat exchanger, via an electric air-conditioner compressor, via a first heat conductor unit, via a second valve, back again to the internal heat exchanger,
wherein the third internal fluid circuit is configured from the internal heat exchanger, via a third expansion valve, via a second evaporator, via the fluid collector, back again to the internal heat exchanger, and
wherein the external fluid circuit is configured from the internal heat exchanger, via a second expansion valve, via a second heat conductor unit, via a first valve, via the fluid collector, back again to the internal heat exchanger;
wherein the operating includes performing at least one of the following: (i) operating the climate control unit using an external fluid circuit and a second internal fluid circuit; (ii) operating the climate control unit using a first internal fluid circuit, a second internal fluid circuit, and a third internal fluid circuit; and (iii) operating the climate control unit using a second external fluid circuit, a first internal fluid circuit, and a second internal fluid circuit.

12. The method of claim 11, wherein the climate-control unit is operated using the first internal fluid circuit, the second internal fluid circuit, and the third internal fluid circuit.

13. The method of claim 11, wherein the climate-control unit is operated using the second external fluid circuit, the first internal fluid circuit, and the second internal fluid circuit.

14. The method of claim 11, wherein the climate-control unit is operated using the external fluid circuit and the second internal fluid circuit.

15. A method for controlling at least one of a climate of an interior and at least one component of an electric vehicle using a climate control device, which includes a plurality of fluid circuit units, and which is configured to at least one of heat and cool the electric vehicle, the method comprising:
activating a first fluid circuit unit, from a first pump, via a first heat source, further via a first three-way valve and via a first heat conductor, back again to the first pump, and using it to control the climate of a first component of the electric vehicle;

activating a second fluid circuit unit, from the first pump, via the first heat source, further via the first three-way valve, further via a second heat conductor and via a third heat conductor, back again to the first pump, being activated and using it to control the climate of the interior of the electric vehicle;

activating a third fluid circuit unit, from a second three-way valve, further via an internal heat conductor, further via a third three-way valve, further, for one, via a first expansion organ and a fourth heat conductor, to a storage reservoir and for another, further via a second expansion organ and a fifth heat conductor to the storage reservoir, from the storage reservoir via a compressor having a second pump, further via the second heat conductor, further via a fourth three-way valve, further via a sixth heat conductor, back again to the second three-way valve, and using it to control the climate and to dehumidify the interior of the electric vehicle; and activating a fourth fluid circuit unit, from a third pump, via a second heat source of a second component of the electric vehicle, further via the fifth heat conductor back again to the third pump, and using it to utilize waste heat of the second heat source.

16. The method of claim 15, wherein the third fluid circuit is used as a coolant circuit having carbon dioxide.

17. The method of claim 15, wherein the third fluid circuit is used as a coolant circuit having carbon dioxide, which is R744 coolant.

* * * * *